United States Patent [19]
Zimmerman et al.

[11] Patent Number: 5,483,622
[45] Date of Patent: Jan. 9, 1996

[54] PAGE PRINTER HAVING AUTOMATIC FONT COMPRESSION

[75] Inventors: Gary Zimmerman; Russ Campbell, both of Boise, Id.

[73] Assignee: Hewlett-Packard Company, Palo Alto, Calif.

[21] Appl. No.: 939,795

[22] Filed: Sep. 3, 1992

[51] Int. Cl.$^6$ .................................................. G06K 15/00
[52] U.S. Cl. ...................... 395/114; 395/110; 395/115; 395/116
[58] Field of Search ......................... 395/101, 110, 395/114, 115, 160, 425, 112, 116, 128, 139, 147; 382/46, 47; 371/2.2; 358/462

[56] References Cited

U.S. PATENT DOCUMENTS

| | | | |
|---|---|---|---|
| 4,555,802 | 11/1985 | Fedak et al. | 382/56 |
| 4,741,635 | 5/1988 | Shibata et al. | 400/121 |
| 4,881,180 | 11/1989 | Nishiyama | 364/518 |
| 4,884,147 | 11/1989 | Arimoto et al. | 358/443 |
| 5,068,805 | 11/1991 | Tsuzuki | 395/164 |
| 5,150,454 | 9/1992 | Wood et al. | 395/103 |
| 5,208,676 | 5/1993 | Inui | 358/296 |
| 5,331,427 | 7/1994 | Namizuka | 358/433 |
| 5,367,620 | 11/1994 | Ito et al. | 395/151 |

FOREIGN PATENT DOCUMENTS

| | | | |
|---|---|---|---|
| 0027566 | 4/1981 | European Pat. Off. | G06K 15/00 |
| 0048625 | 3/1982 | European Pat. Off. | G06K 15/00 |

*Primary Examiner*—Raymond J. Bayerl
*Assistant Examiner*—Tracy M. Legree

[57] ABSTRACT

A page printer includes random access memory (RAM) whose capacity is insufficient to store certain page configurations; a processor; and a control memory that holds at least one data compression procedure. The page printer performs a font compression method that comprises the steps of: issuing a memory low/out signal when insufficient RAM is available to store portions of an input data stream; if raster graphics images are present in portions of the input data stream, attempting to compress those images to remove the memory low/out signal; if no raster graphics images are present in the input data stream, compressing font characters by use of a data compression procedure; and if the attempted compression of the raster graphics images is unsuccessful in removing the memory low/out signal, compressing font characters by use of a data compression procedure. The page printer also may be controlled to automatically data compress a large size font whose size exceeds a second threshold (which may be related to available printer RAM), under circumstances where a memory low/out signal is not present.

15 Claims, 11 Drawing Sheets

BIT MAP OF CHARACTER

COMPRESSED CHARACTER

CHARACTER COMPRESSION

EARLY FONT COMPRESSION (LARGE FONT)

CHARACTER DECOMPRESSION

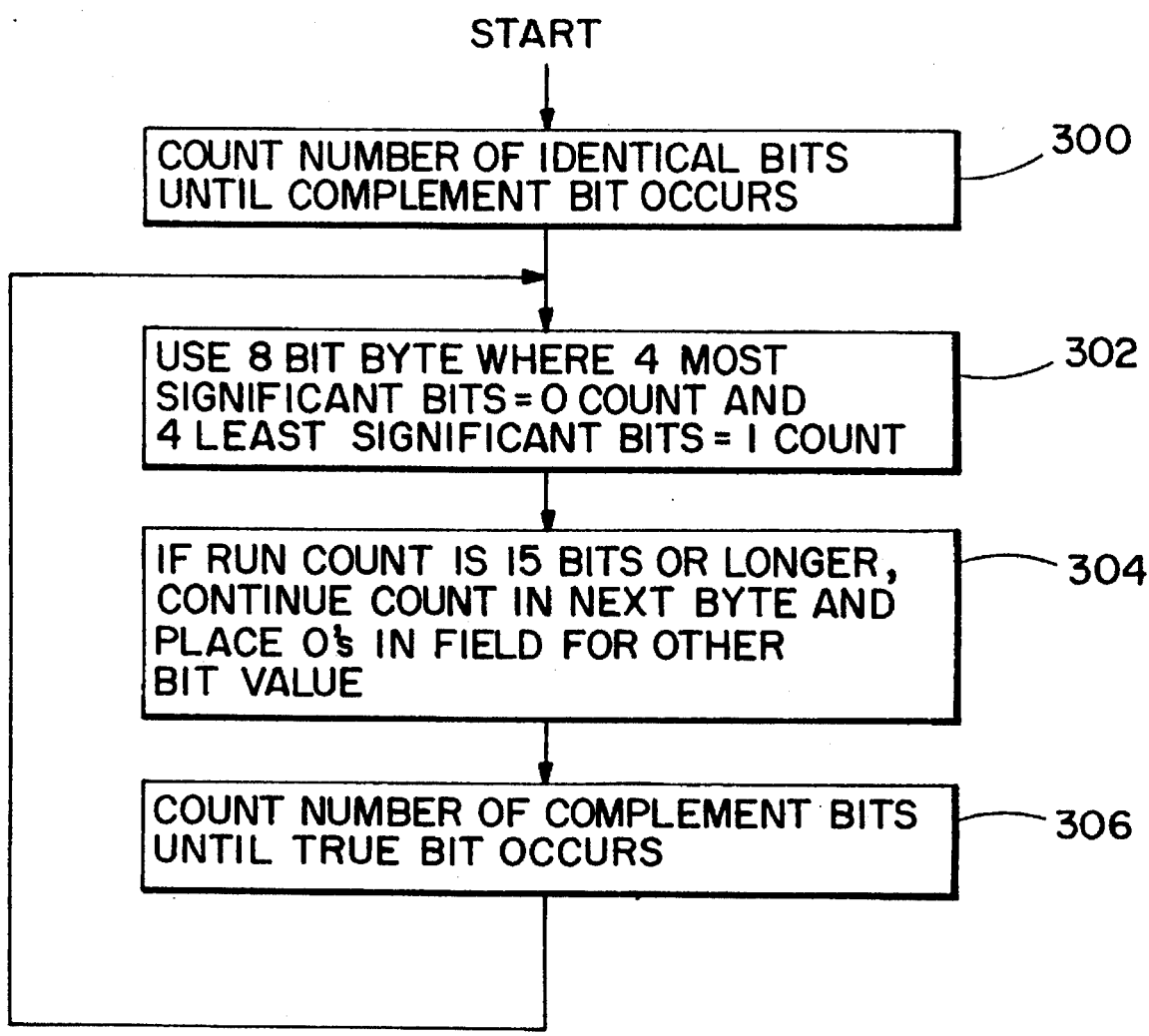

PAGE PRINTER HAVING AUTOMATIC FONT COMPRESSION

FIELD OF THE INVENTION

This invention relates to page printers and, more particularly, to a page printer having font compression facilities to accommodate a buffer memory size that is less than that required for a full page of printed data.

BACKGROUND OF THE INVENTION

Prior art page printers typically capture an entire page before any image is placed on paper. In such printers, formatting is either performed on the host computer (with large volumes of rasterized data being shipped to the printer), or on a formatter within the printer. Since a laser print "engine" operates at a constant speed, if new rasterized data is not available at a rate that keeps up with the engine's operation, a print "overrun" occurs and the page is not printable.

To prevent print overruns, a variety of techniques are in use. In one, a full raster bit map of an entire page is stored so that the print mechanism always has rasterized data awaiting action. At 300 dots per inch resolution, this technique requires approximately a megabyte of raster memory for each page. At 600 dots per inch, four megabytes of memory are required. Additionally, because laser printers achieve their rated speeds by pipelining of raster data, additional raster memory is needed to run the printer at its rated speed. Otherwise, composition of a following page cannot begin until a prior page has been ejected to the printer's output tray.

To maintain the cost of laser printers at a low level, substantial efforts have been directed to reducing the amount of required raster memory. One technique for memory reduction involves the construction of a page description. The page description is built in two steps: during formatting, data received from a host computer is converted into a list of simple commands, called display commands, that describe what must be printed. The second step prepares the display command list for printing and entails a parsing of the display commands and a rendering of the described objects into a raster bit map. This procedure requires a full page raster bit map memory because the same memory is used for succeeding pages.

To reduce the amount of required memory, the display command list procedure has been modified by sorting display commands according to their vertical position on a page. The page is then divided into sections called page strips or "page intermediate", and each page strip is passed, sequentially, to the print engine for printing. When display commands within a page strip are rendered into rasterized data at a fast enough pace, the same memory used to store a first page strip can be reused for a subsequent page strip further down the page (once the first page strip has been transferred to paper).

The Laser Jet III Laser Printer, manufactured by the Assignee of this application, employs a display command list algorithm and utilizes three raster buffers for page intermediate strips. The first buffer is reused on the fourth strip of a page; the second buffer is reused on the fifth strip, etc. For an eight page per minute printer, little time is left between the finishing of strip one and the time when strip four will be required by the print mechanism. If the strip is not delivered in time, a "print overrun" occurs and the page is incorrectly printed.

Most recently, 600 dot per inch resolution printers have been introduced to the marketplace. Such printers handle not only text but also line art and various types of images. To minimize the amount of memory required in such printers, data compression techniques are employed. For instance, run length data compression is used by host processors in the process of data transfer to the printer. In a runlength encoding scheme, data that repeats is encoded by indicating the identity of the data and the run/length of the repeat.

As can be seen from the above, printers have employed compression of images and line art to enable minimization of raster image buffer memories. However, even the use of sophisticated data compression procedures does not always prevent the occurrence of a print overrun. Character fonts have generally not been subject to compression even though they occupy substantial memory space in printer buffer memories. Some host processors download a bit map of a font directly into the printer's buffer. Certain printers also include internally stored fonts that are termed "scalable". A scalable font is one wherein an outline of a character is stored in printer memory. When the font is required for use in the printer, it is scaled to the proper size, loaded into random access memory, the interiors of the outlined characters "filled" and then preserved for use as fully configured character bit maps.

Certain printer control languages (e.g., PCL) require that font bit maps be contiguously stored within a printer's memory. Small fonts do not create substantial memory capacity problems because the associated bit maps are small. However, large fonts can occupy significant memory, as the size of memory needed to store such a font grows as the square of the font "point size". Large numbers of contiguous memory blocks may not be available in the printer when a large font is received. Furthermore, reserving large contiguous blocks of memory is wasteful and is to be avoided, if possible.

Accordingly, it is an object of this invention to provide a page printer having a compression procedure which operates upon character fonts.

It is another object of this invention to provide a page printer that selectively data compresses fonts so as to more efficiently utilize available buffer memory size.

It is yet another object of this invention to provide a page printer that selectively employs font data compression when buffer memory is indicated as being either low or in an "out" state.

SUMMARY OF THE INVENTION

A page printer includes random access memory (RAM) whose capacity is insufficient to store certain page configurations; a processor; and a control memory that holds at least one data compression procedure. The page printer performs a font compression method that comprises the steps of: issuing a memory low/out signal when insufficient RAM is available to store portions of an input data stream; if raster graphics images are present in portions of the input data stream, attempting to compress those images to remove the memory low/out signal; if no raster graphics images are present in the input data stream, compressing font characters by use of a data compression procedure; and if the attempted compression of the raster graphics images is unsuccessful in removing the memory low/out signal, compressing font characters by use of a data compression procedure. The page printer also may be controlled to automatically data compress a large size font whose size exceeds a second threshold (which may be related to available printer RAM), under circumstances where a memory low/out signal is not present.

DESCRIPTION OF THE DRAWINGS

FIG. 13 is a high level flow diagram illustrating a bit run length (BRL) compression procedure used herewith.

DETAILED DESCRIPTION OF THE INVENTION

Hereafter, the invention will be described in the context of a laser page printer, however it should be understood that other peripheral units such as plotters, facsimile units, etc. can make use of the procedures described herein.

PRINTER SYSTEM

Figure 1:
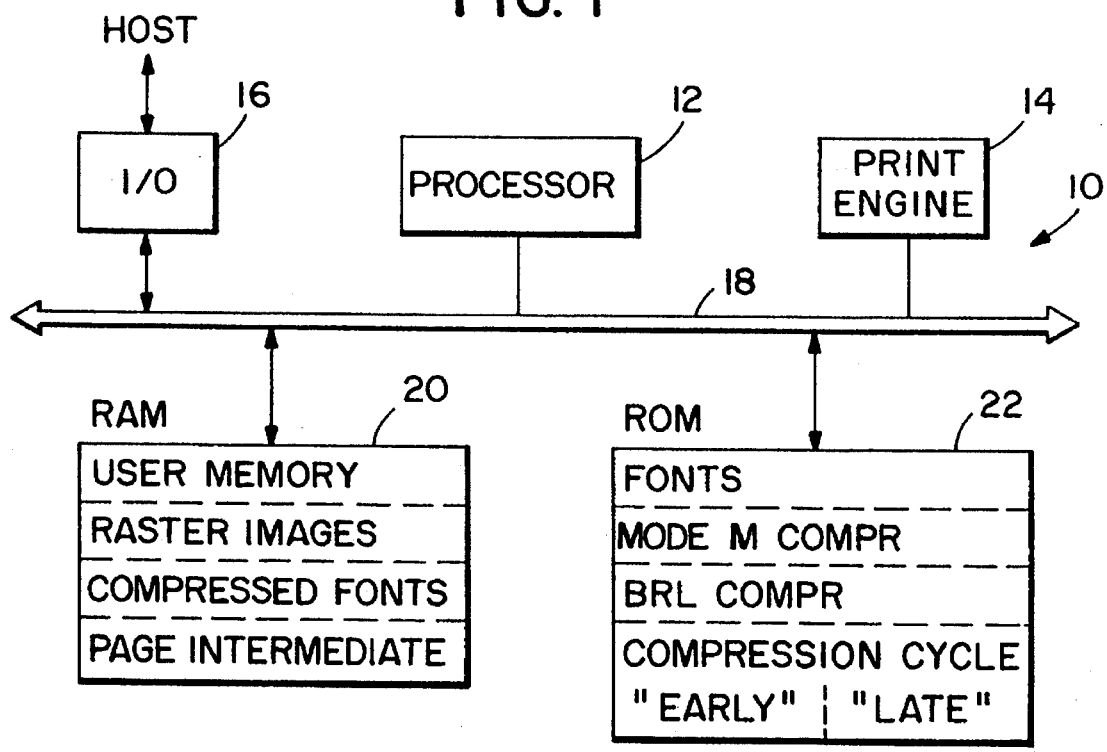
FIG. 1 is a high level block diagram of a page printer for carrying out the invention.

In FIG. 1, printer 10 includes a processor 12, a laser print engine 14, and an input/output (I/O) port 16, all connected by a bus 18. Print engine 14 comprises a laser print mechanism which, when operated, runs at a constant speed and must be provided with video raster print data at a rate that keeps up with its operation. A random access memory (RAM) 20 and a read only memory (ROM) 22 are also connected to bus 18 and contain the procedures necessary to assure that available RAM 20 is most efficiently used and that print engine 14 always has data awaiting printing, so as to avoid print overruns.

The amount of memory in RAM 20 that is available to store a received data stream is substantially less than that required to contain an entire video raster bit-map image of a page. Image and font data from a host processor is received via I/O module 16 and is read into RAM 20. In the case of a downloaded bit map of a font character, the character is accompanied by a header that identifies the character's height, width, if the character has been compressed and which compression procedure was employed.

RAM 20 includes a plurality of areas allocated for various applications: i.e., user memory, raster images, compressed fonts, and page intermediate representations. ROM 22 includes stored scalable fonts, several compression procedures, i.e., "mode M" (to be described below) and bit run length; and a procedure for carrying out a compression cycle that may either occur when a font character is received (i.e., "early") or only when a memory low/out signal is provided (i.e., "late").

When printer 10 receives image data, the data is parsed and characters and images are processed. The images are processed to derive raster graphics data that is stored in RAM 20. Such raster graphics images are linked into an intermediate page representation ("page intermediate") which is a means of representing an entire page of information in a format that is easily convertible to video raster, while consuming as little memory as possible. Page intermediate actions essentially divide a page into a plurality of strips, each strip including a prescribed number of instructions. Each strip is allocated a height and a total data capacity.

In the conversion of graphics data to page intermediate, it may become evident that the contents of a strip exceed a threshold that is based upon the size of the strip's video buffer. It may also occur that after conversion of a plurality of strips to raster images, insufficient memory remains to complete the page intermediate conversion. In such cases, processor 12 issues a memory low/out signal which causes further image compression procedures to be attempted. Such image compression procedures are described in an application entitled "Page Printer Having Adaptive Data Compression For Memory Minimization" (Attorney's Docket 1092076), filed on even date herewith, the contents of which are incorporated by reference.

In the printer disclosed herein, if image data compression is insufficient to remove the memory low/out signal, a font compression procedure is invoked to achieve additional memory savings. In a further version of the invention, if font characters exceeding a threshold size are received from the host processor, they are immediately compressed irrespective of whether a memory low/out signal has been generated. The threshold size is related to an amount of available printer RAM.

BANDED FONT CHARACTERS

Figure 2:
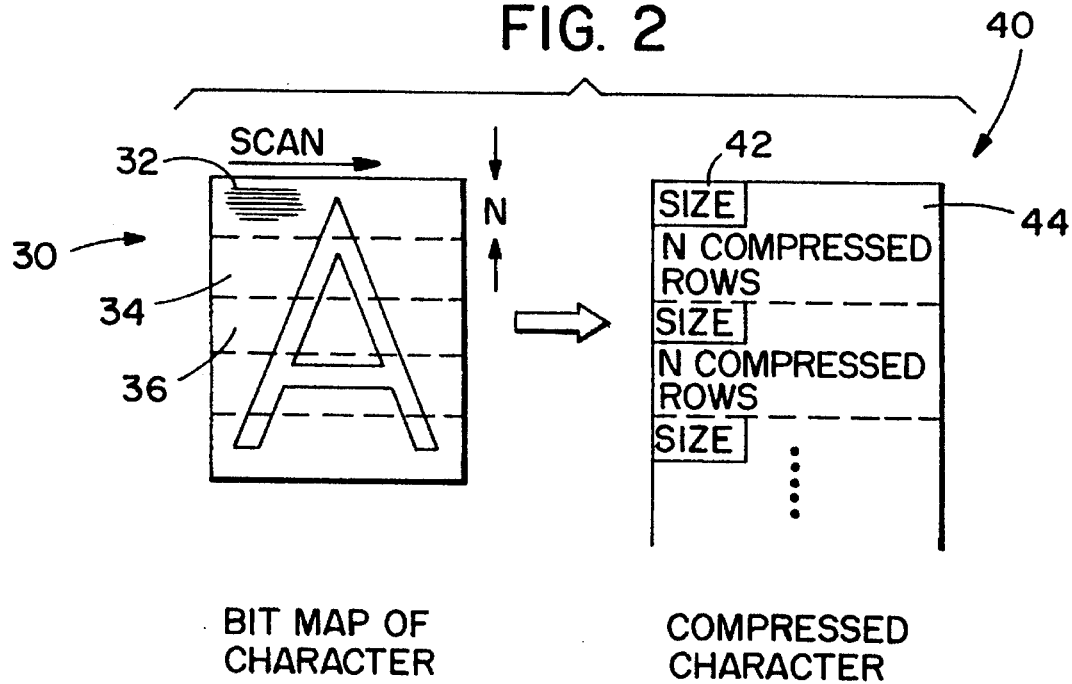
FIG. 2 is a representation of a character bit map indicating bands used during data compression.

In FIG. 2, the character A is shown encompassed by a schematically represented bit map 30. Bit map 30 comprises a plurality of horizontal raster scan lines of individual pixels whose on or off states control the particular character represented. Each bit map 30 is divided into a plurality of bands 32, 34, 36, etc, each band comprising N rows of pixels. As will be hereafter understood, the "banding" of character bit maps enables more rapid decompression of a compressed bit map in the event that the bit map spans plural page intermediate strips.

Each band is individually data compressed as shown by compressed character representation 40. Each band is represented in compressed character representation 40 by a data block that includes a size field 42 and a data field 44. Size field 42 defines the size of the band, after compression, and data field 44 contains encoded characters that enable the raster bit image to be reproduced. Thus, a compressed character essentially comprises a plurality of data structures (size and data fields), each of which defines a character band in a compressed form. These bands can either be stored contiguously in RAM or linked together non-contiguously.

OVERALL DATA COMPRESSION PROCEDURE

Figure 3:
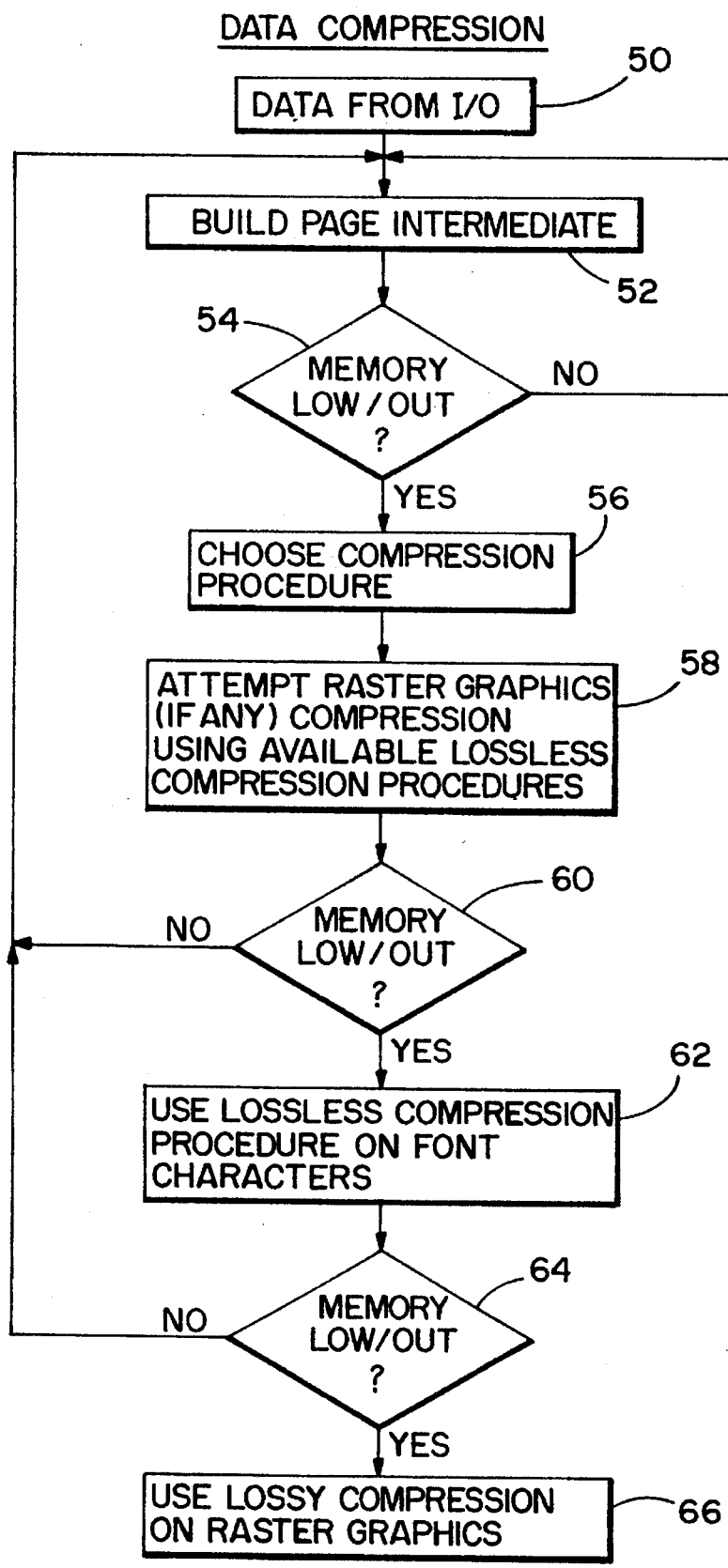
FIG. 3 is a high level flow diagram illustrating the overall data compression procedure used by the system of FIG. 1.

As shown in FIG. 3, the data compression procedure employed by printer 10 commences when a data stream is received through I/O module 16 (box 50). At this stage, processor 12 under control of a procedure stored in RAM 22, begins to build page intermediate strips from the incoming data stream (box 52). If at any time, processor 12 issues a memory low/out signal (decision box 54), a compression procedure is chosen (box 56) and an attempt is made to compress received graphics images (box 58). The initial chosen compression procedure is one which enables lossless compression actions to be accomplished (i.e., where compressed data can be reconstructed without loss of information).

If the attempted data compression procedure is successful, the memory low/out signal is removed (decision box 60), and the procedure continues building page intermediate strips. A similar action occurs at decision box 54 if no memory low/out signal occurs.

If the memory low/out signal remains (decision box 60), processor 12 commences a lossless compression procedure on font characters. If the compression of font characters is successful in removing the memory low/out signal (decision box 64), then the procedure cycles back to page intermediate processing (box 52). If, however, the memory low/out signal remains, then a "lossy" compression procedure (box 66) is employed on the graphics images, but not on the font characters. Lossy compression normally enables a memory low/out signal to be removed, however at the cost of image precision on decompression.

FONT COMPRESSION

Figure 4:
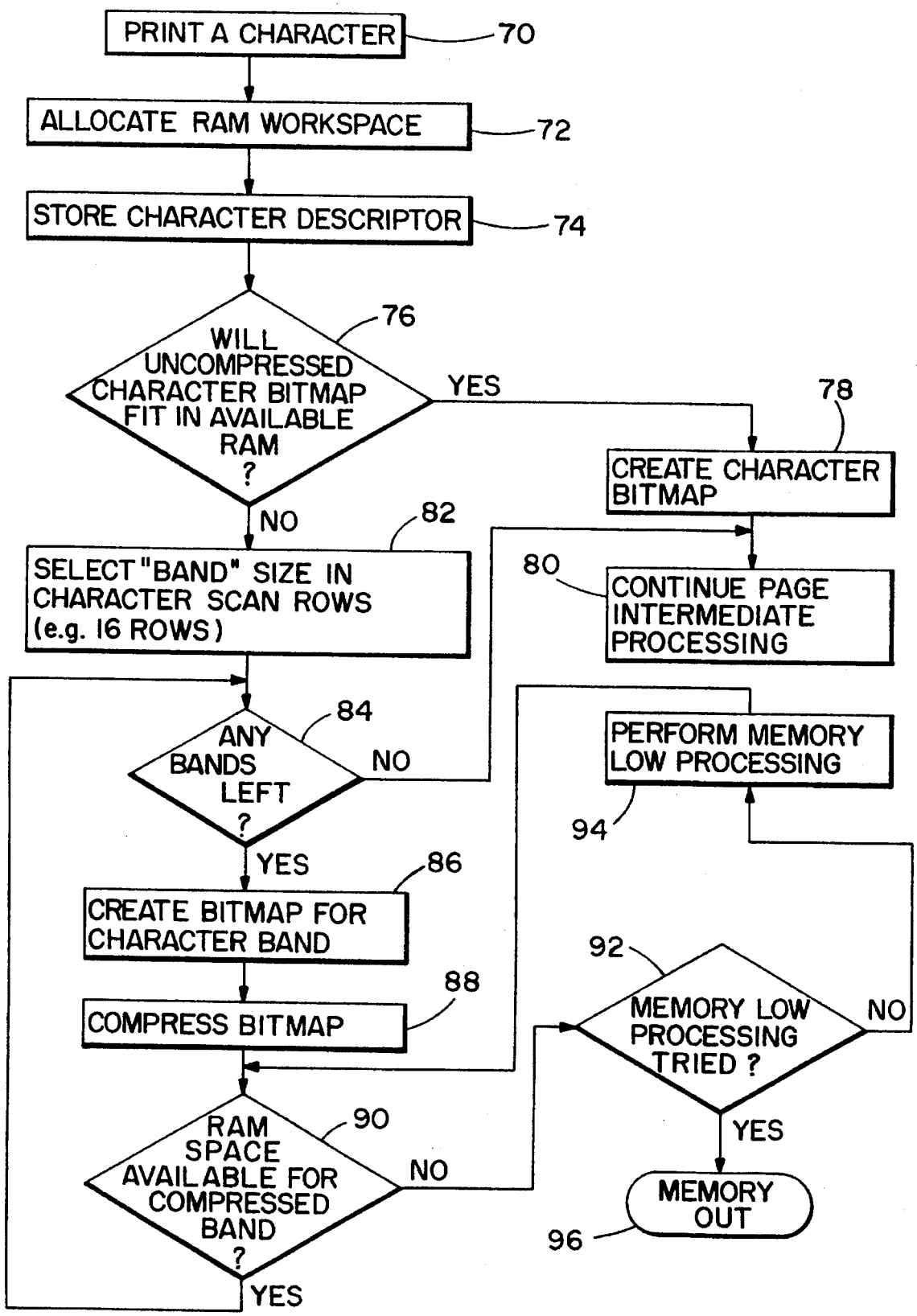
FIG. 4 is a high level flow diagram of a first embodiment of a font compression procedure that is employed on a memory low/out signal.

In FIG. 4, a preferred embodiment of a font compression procedure is illustrated. In response to a print a character command (box 70), an area of RAM workspace is allocated or otherwise obtained (box 72) and the descriptor of the character is stored therein (box 74). Data from that descriptor enables determination of the size of the uncompressed character. Based upon the size, it is then determined whether sufficient RAM space is available to store the uncompressed character (decision box 76). If sufficient space is available, the character's bit map is created (box 78) and page intermediate processing continues (box 80).

By contrast, if the uncompressed character is seen not to fit within available RAM space (decision box 76), a band size (in character scan rows) is selected to be employed during character compression action. (The larger the point size of the character, the more scan rows may be included in each band). Character data is compressed in bands of 16 scan rows (or some other configurable number), starting with the first row of the character. This is done to facilitate the case where a single character spans more than one strip of the page. In such cases, decompression of the portion of the character in a strip starts at the first 16 row band which has data within the strip. The 16 row band is chosen as a tradeoff between how much unnecessary data must be decompressed for each character (up to 15 scan rows) and how much data may be compressed into one band (the more data in a band, the higher the compression ratio). Thus, if a character appears in more than one strip, it can be decompressed on-the-fly without always decompressing from the start of the character's compressed image.

Subsequent to the selection of band size, it is determined whether any bands of the character are left to process (decision box 84) and if no, page intermediate processing continues (box 80). If, however, character compression is just commencing, there will obviously be bands left and in that case, a bit map is created for the character band in accordance with stored instructions (box 86). The bit map is then compressed using an appropriate compression procedure (box 88). As will be hereinafter understood, the two compression procedures are preferred, i.e., mode M and bit run length, however other compression procedures may also be employed.

Once the character bit map is compressed, it is determined whether RAM space is available for the compressed band (decision box 90), and if no, and memory low processing has not been tried (decision box 92), such memory low processing is performed (box 94). In this instance, memory low processing comprises attempting to compress uncompressed image data employing previously untried lossless or lossy procedures. If memory low processing has already been tried, a memory out signal is issued (box 96). So long as RAM space is available for a compressed character band, the procedure continues (decision box 84) until all bands are finished. It is to be noted in this embodiment that an attempt is made to compress all characters, irrespective of font size.

CHARACTER COMPRESSION

Figure 5:
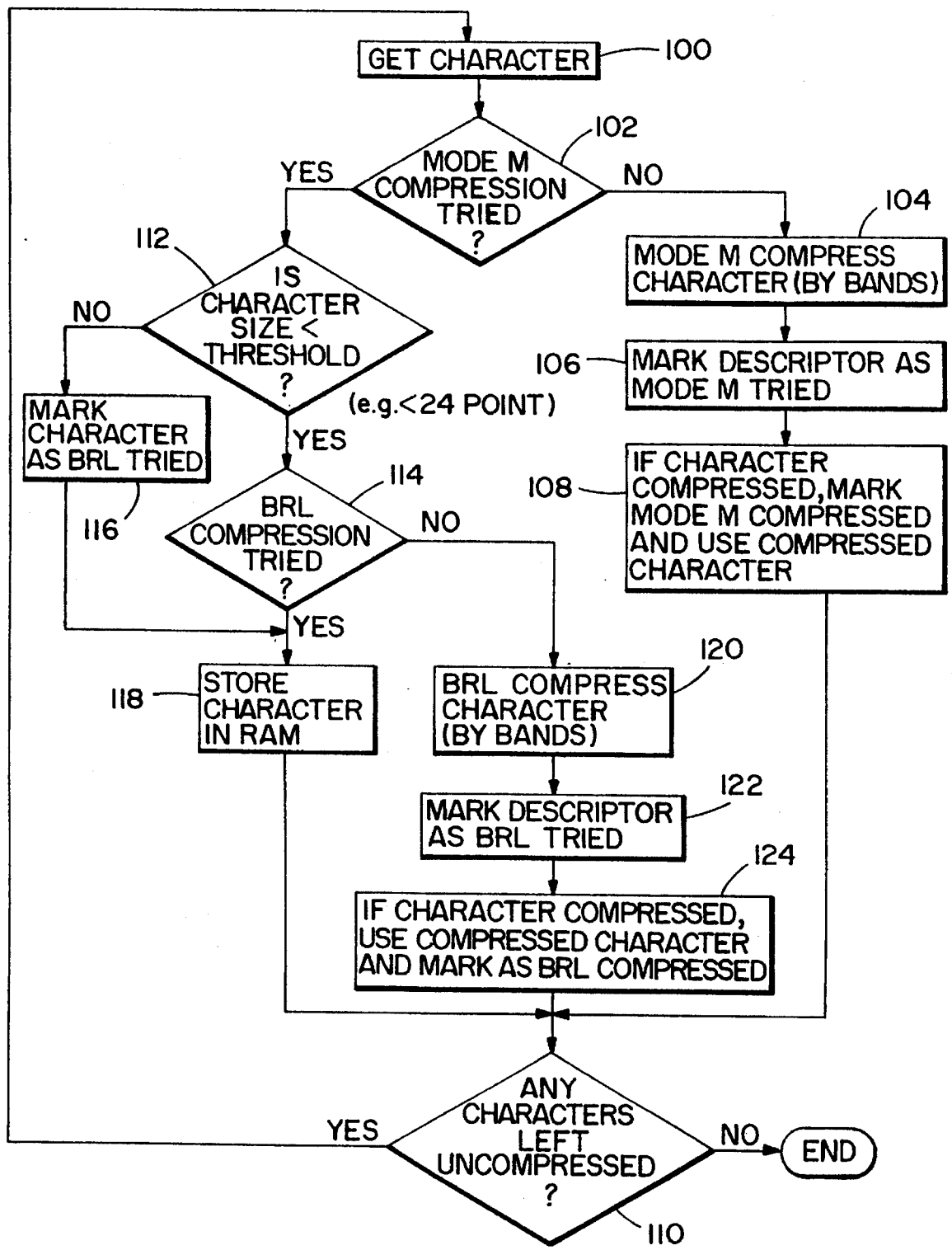
FIG. 5 is a high level flow diagram of a character compression procedure used in the font compression procedure of FIG. 4.

As shown in FIG. 5, initially, a character is obtained (box 100), and it is next determined whether mode M compression has been tried (decision box 102). Mode M compression is a compression procedure wherein both horizontal and vertical redundancies in a block of data are examined to obtain data compression. The details of mode M compression are described below with respect to FIGS. 10 and 11. In brief, mode M compression examines word length data groups (e.g. 8 bit or 16 bit words) along each scan row of a character band. In a first scan row, only run-length compression is performed, based upon the occurrence of like words therein, On subsequent rows in the band, words are compared to words in an immediately preceding scan row to determine an identity or lack of identity condition (i.e. "same" or "different"). In accordance with the same or different finding, a same/different command is generated indicating the number of "same" words in a scan row and the identity of a succeeding different word that terminates the run of "same" words. Run length data compression is also used after a different word is determined and until a next same word is experienced (i.e. a word which is the same as a word in an immediately preceding row).

Mode M compression is extremely fast in execution and achieves compressions in the range of 2:1 through 8:1. For instance, a 72 point font will typically compress at 6:1 using an 8-bit word. Mode M (using an 8-bit word) is also faster during compression and decompression than is bit run length compression (typically 50% faster).

As shown in FIG. 5, if mode M compression has not been tried (decision box 102), the bands of a character are mode M compressed (box 104) and the character's descriptor is marked as "mode M tried" (box 106). If the character compressed, the descriptor is also marked as "mode M compressed" and the compressed character is utilized (box 108). If the character did not compress, the procedure moves to determine if any characters are left uncompressed (decision box 11 0) and if yes, the procedure recycles to box 100. If mode M compression has already been tried (decision box 102), the procedure branches to determine if the character size is less than a preset threshold (decision box 112). This decision is an important precursor in determining whether to use bit run length (BRL) compression. BRL compression is used for character bit maps which are smaller than a certain size (e.g. a size that typically represents 24 point or smaller). BRL works well on small characters (typically achieving compression ratios of 1.5:1–1.8:1), because bit runs that are present in small characters are typically longer than 4 bits and BRL codes each bit run to a 4 bit field. BRL also works for larger characters but is not optimal since larger characters have a greater degree of row and word similarity and can be better compressed using mode M. The basic BRL compressed word is two 4 bit values. The most significant 4 bits represent the number of zero bits in a run and the least significant 4 bits, the number of one bits in a run. If a run is 15 bits or longer, it's count is continued in another word by placing zeros in the next run length field for the other bit value.

As shown in decision box 112, if the character size is not less than a preset threshold, the character is marked as "BRL tried" (box 116) and the character is stored in RAM (box 118). If the character is found to be less than the threshold, it is next determined whether BRL compression has been tried on it (decision box 114). If yes, the character is stored in RAM (box 118) and if no, BRL compression is carried out on the bands that comprise the character bit map (box 120). The character descriptor is then marked as "BRL tried" (box 122) and if the character compressed, it is used (in lieu of the uncompressed bit map) and its descriptor is marked "BRL compressed". The procedure continues until all characters of the font have been processed.

EARLY FONT COMPRESSION

Figure 6:
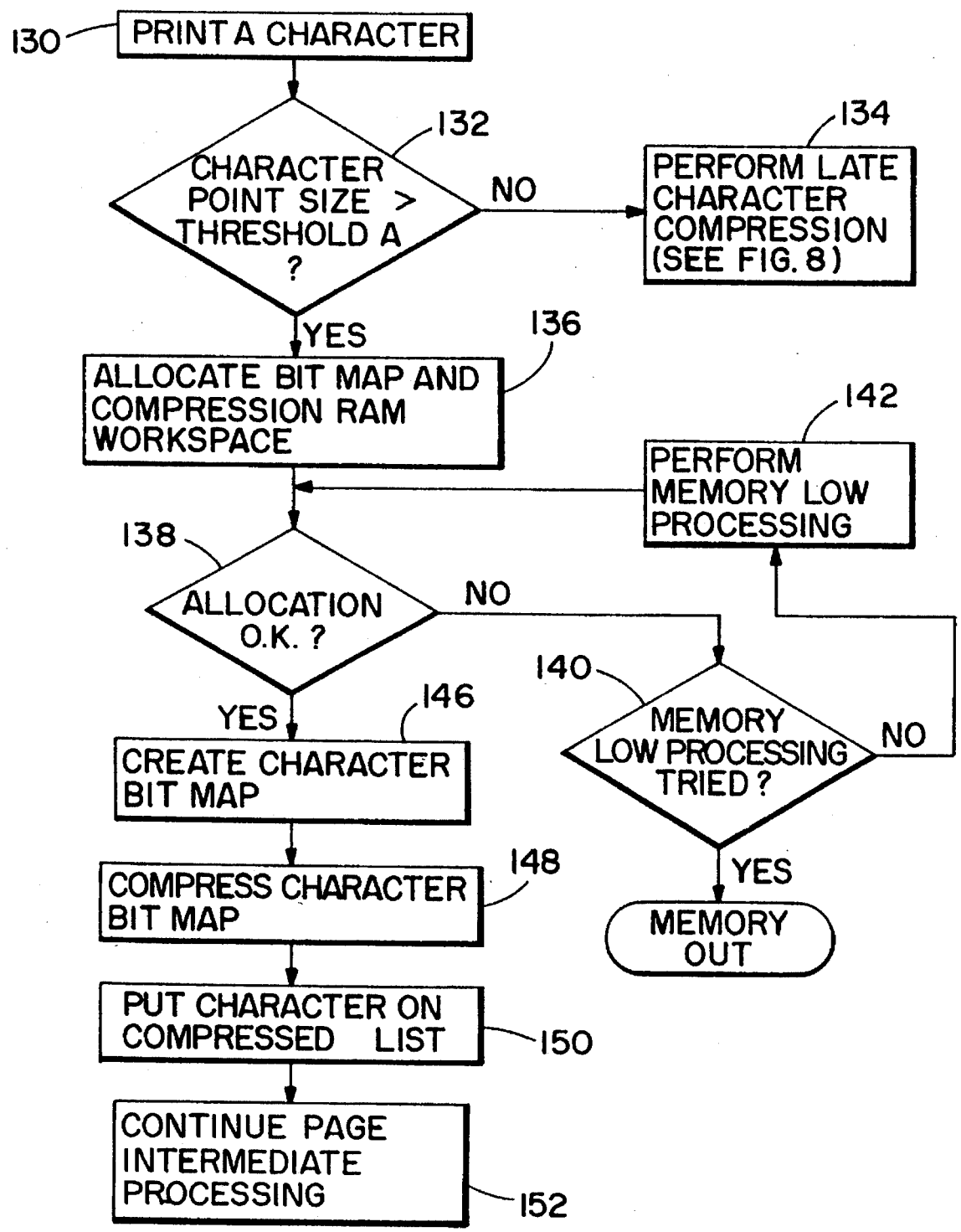
FIG. 6 is a high level flow diagram illustrating a second embodiment of the invention wherein large font sizes are compressed upon receipt, without regard to a memory low/out signal (termed "early" compression).

Turning to FIG. 6, a second embodiment of the invention is shown wherein "early" font compression is employed that is not dependent upon whether a memory low/out signal has been issued. In this case, font compression is automatically imposed upon a character, as it is received, if its font size exceeds a first threshold. If the font size is determined to be less than the first threshold, the character is stored, and then only character fonts that exceed a second threshold (i.e. a minimum point size) are compressed upon a memory low/out signal—rather than all font sizes, as in the first embodiment of the invention.

Figure 7:
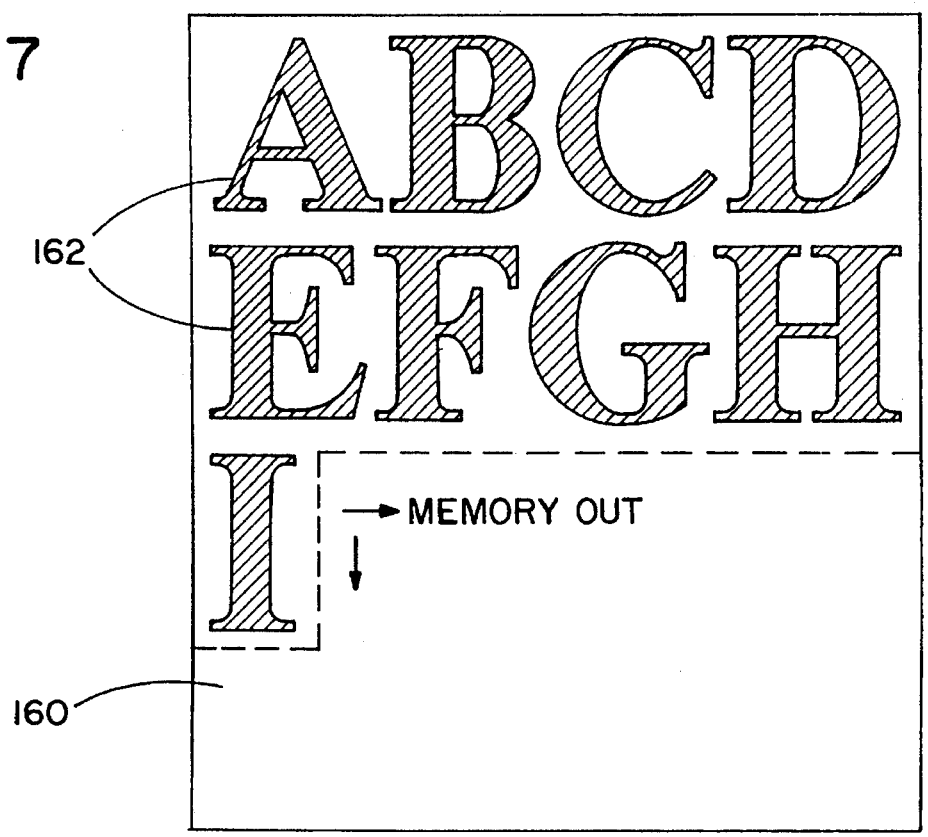
FIG. 7 shows a page that includes a plurality of large font characters which lead to a memory low/out signal before the entire page is printed.

Early compression action on characters with a font size that exceed a threshold (a "large" font size) enables a printer system to operate more efficiently with less memory fragmentation. In FIG. 7, a page 160 is shown upon which a plurality of large font size characters 162 are to be printed. Given the limited random access memory available for storage of page intermediate strips and font characters, a memory out condition will be experienced well before all of the large characters to be printed are processed. For this reason, font compression proceeds immediately in such a case, without awaiting receipt of a memory low/out signal.

Returning to FIG. 6, upon receiving a command to print a character (box 130), a character's descriptor is initially examined to determine if its font point size is greater than a predetermined threshold, i.e. threshold "A" (decision box 132). The descriptor examination occurs as the character is initially being received, via I/O module 16, and before the remainder of the character is processed.

Figure 8:
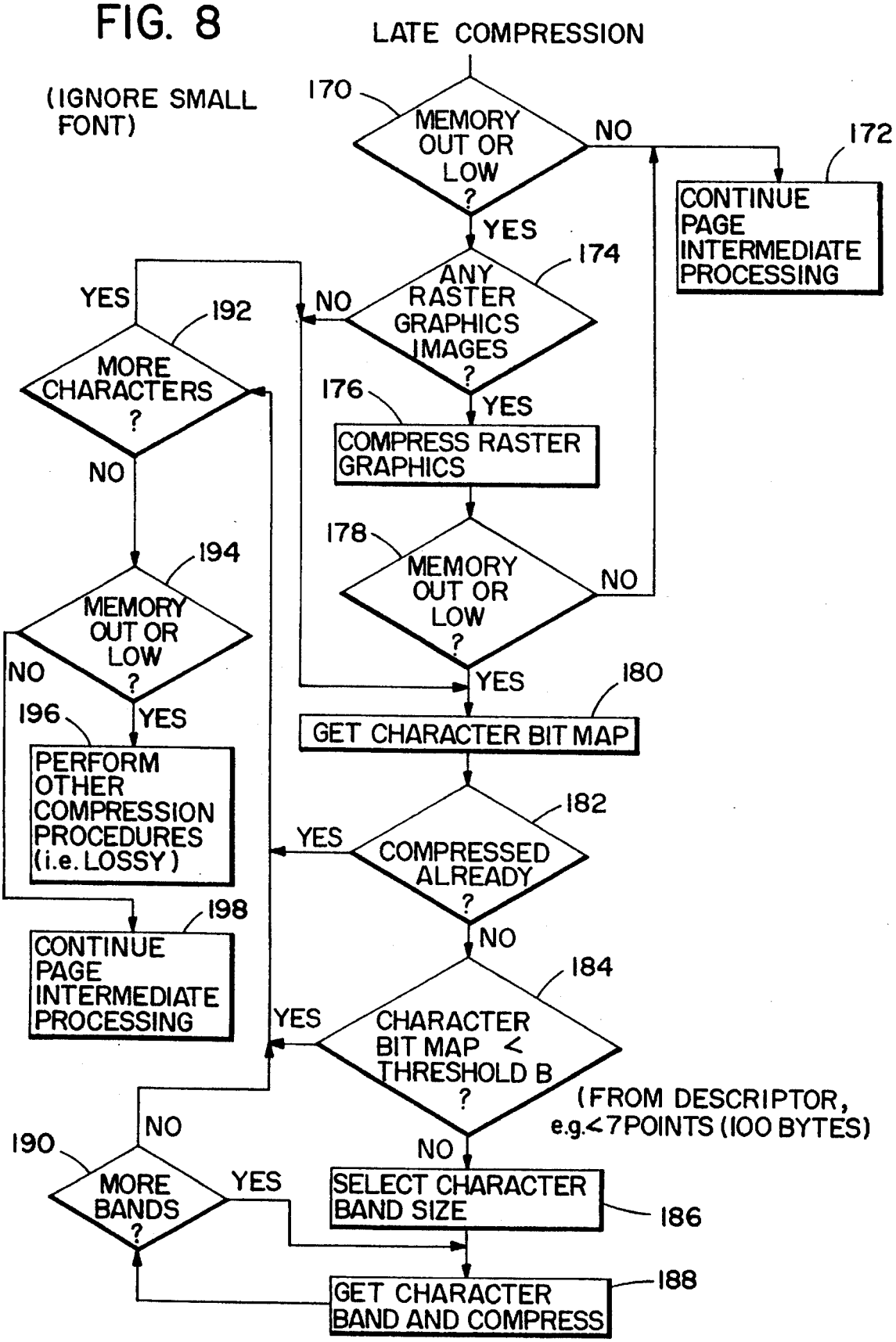
FIG. 8 is a "late" font compression procedure that ignores small font sizes in its compression actions.

If the character's point size is determined to be less than threshold A, a "late" character compression procedure (box 134) occurs, as shown in FIG. 8. If the character point size is found to be greater than threshold A, RAM work space is allocated for both the character bit map and the compressed version of the character (box 136). If insufficient memory is available for allocation (decision box 138), the procedure attempts memory low/out processing upon image data if it has not already been tried (decision box 140, box 142). If memory low/out processing has been tried, a memory out signal is issued. If the RAM work space allocation succeeds (decision box 138), a character bit map is created for the received character (box 146) and it is then compressed, e.g. via mode m (box 148). The character is then listed on a compressed data list (box 150)—to be used during decompression—and page intermediate processing continues (box 152).

In FIG. 8, a "late" font compression procedure is shown wherein character fonts smaller than threshold A are compressed. In general, so long as a memory low/out signal is not present (decision box 170), page intermediate processing continues (box 172). Once a memory low/out signal is issued, the page being processed is examined to determine if there are any graphics images thereon (decision box 174). If yes, data compression of the images is attempted (box 176), and it is then determined whether the memory low/out condition still remains. If no, the procedure continues with page intermediate processing. If yes, compression of font characters is tried. In a similar fashion, if there are no graphics images on the page, font character compression is tried.

Character compression commences by obtaining a bit map representation of a character on the page (box 180) and determining, by examining its descriptor, whether the character has been already compressed (decision box 182). If not, it's descriptor further is examined to determine if its point size is less than a second threshold B that is less than first threshold A (decision box 184). In this instance, threshold B may indicate a character size of seven points (100 bytes) or less. If the point size is greater than threshold B, a character band size is selected (box 186), dependent upon the point size. The individual character bands are then data compressed (box 188) using an appropriate compression technique, e.g., mode m. Until all bands of the character are compressed, the compression continues (decision box 190).

If the character bit map accessed has already been compressed, has a point size less than threshold B, or compression of the character has finished, it is determined whether there are more characters to be compressed (decision box 192). If yes, the procedure recycles back to box 180. If no, it is determined whether the memory low/out condition still exists and if so, other compression procedures are attempted with respect to images on the page (box 196). One such procedure might involve the subjecting of such images to a lossy compression procedure. If the memory low/out condition is removed by the character compression actions, page intermediate processing continues (box 198).

As above indicated, early compression is reserved for character font point sizes greater than threshold A. Late compression is used when the character font point size lies between thresholds A and B. Thus, the higher the level of threshold A, the more late compression that occurs. Threshold A may be dynamically adjusted when more RAM is available so as to minimize unneeded early compression. When the point size of a font character is sufficiently large, early compression has the advantage of maximizing available memory for the rest of the system, maximizing the number of characters available in a font cache, and minimizing fragmentation of memory. Furthermore, when this procedure is extended to very large font characters, early compression is often a necessity as without it, the printer may run out of memory.

DECOMPRESSION

Figure 9:
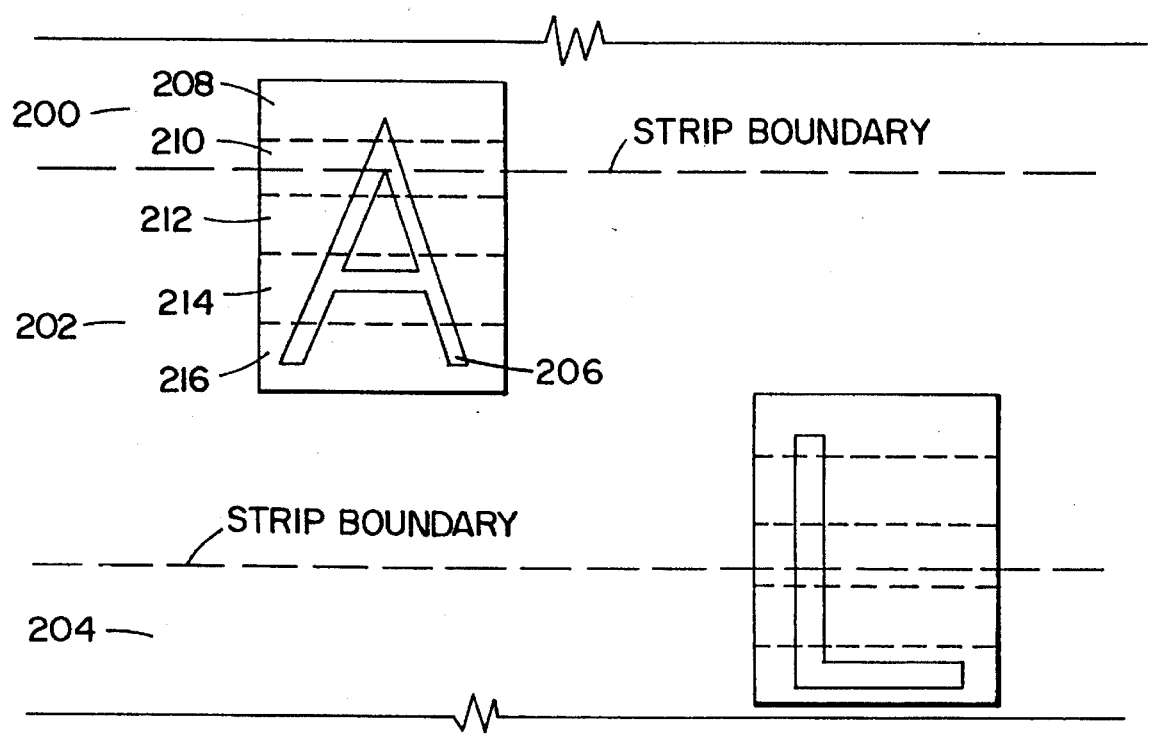
FIG. 9 is a schematic indication of how a banded character can overlap a strip boundary of a page intermediate strip.

In FIG. 9, a plurality of page intermediate strips 200, 202 and 204 are illustrated. A character A 206 spans page intermediate strips 200 and 202 and its character bit map comprises bands 208, 210, 214, 216 and 218. Band 208 is entirely within strip 200 whereas band 210 spans strips 200 and 202. As will be recalled, each character band encompasses a plurality of raster scan rows within a page intermediate strip and, after compression, consists a size field followed by a data field that indicates the compressed values of the bit map comprising the band. As will been seen with respect to FIG. 10, banding of characters enables more rapid decompression thereof. Since each band comprises a preset number of scan rows, the initial scan row of any band can be found by simply knowing the first scan row of a first band 208.

Figure 10:
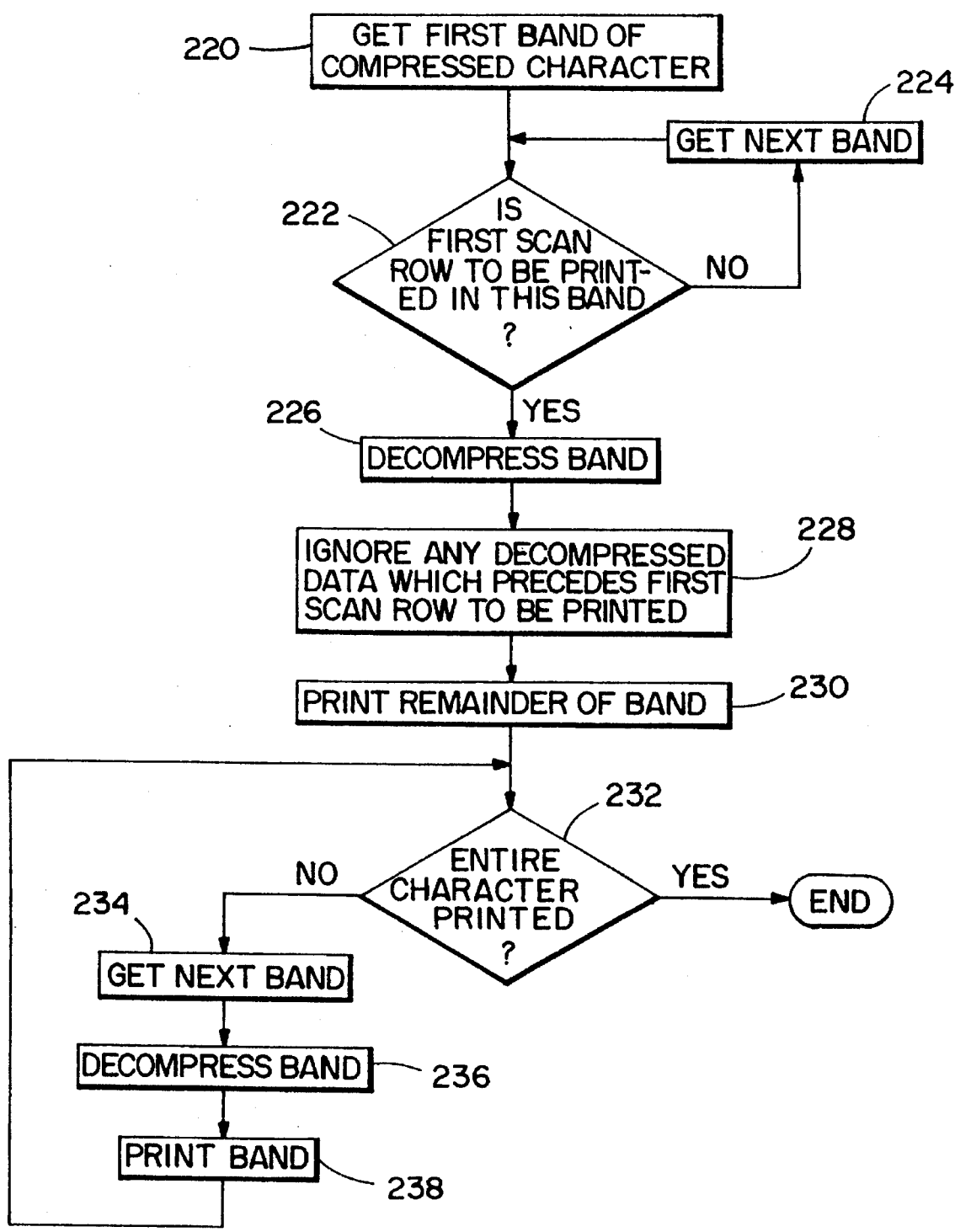
FIG. 10 illustrates the procedure for decompressing a character in the event of a strip boundary overlap.

Turning to FIG. 10, character decompression will be described in relation to the flow diagram shown therein. Such decompression occurs during conversion of page intermediate strip data to a raster scan bit map representation of the entire strip. Initially, a first band of a compressed character is accessed (box 220) and this enables the first scan row of the character to be determined. Next, it is determined whether the first raster scan row to be printed in a strip is resident in the accessed band (decision box 222). If it is assumed that page intermediate strip 202 is being processed, then the first scan row to be printed is the scan row at the strip boundary between strips 200 and 202. Thus, as to band 208 of character 206, the answer is no and a next band (210) is accessed (box 224). Decision box 222 then indicates that the first scan row to be printed resides in band 210. The procedure then decompresses band 210 (box 226) using a complement of the compression procedure. The character descriptor includes a complete record of what compression techniques have been tried and which compression procedure was actually used to compress the character bit map.

Once band 21 0 is decompressed and the band bit map reconstructed, raster rows that precede the first scan row of strip 202 are ignored (box 228). Then, starting with that scan row, the remaining rows of band 210 are printed (box 230). It is subsequently determined whether the entire character has been printed (decision box 232). If not, the procedure continues as shown in boxes 234, 236 and 238 until the entire character has been printed, at which point the procedure is at an end for the particular character. The procedure is repeated for all subsequent characters in the strip.

MODE M COMPRESSION

Mode m compression attempts to compress a character band using both run length encoding and encoding of "delta" changes that occur from row to row within a band. The mode m procedure uses "same", "different" and "run" states during its operation. The "same" state enables a count to be accumulated each time a byte length of bits in a row is the same as a vertically aligned byte in a preceding row. When the "different" state is active, a count is incremented each time a byte on one row is different from a vertically aligned byte on a previous row. A third count is employed to record a run length of identical bytes that occur in a row.

Figure 11:
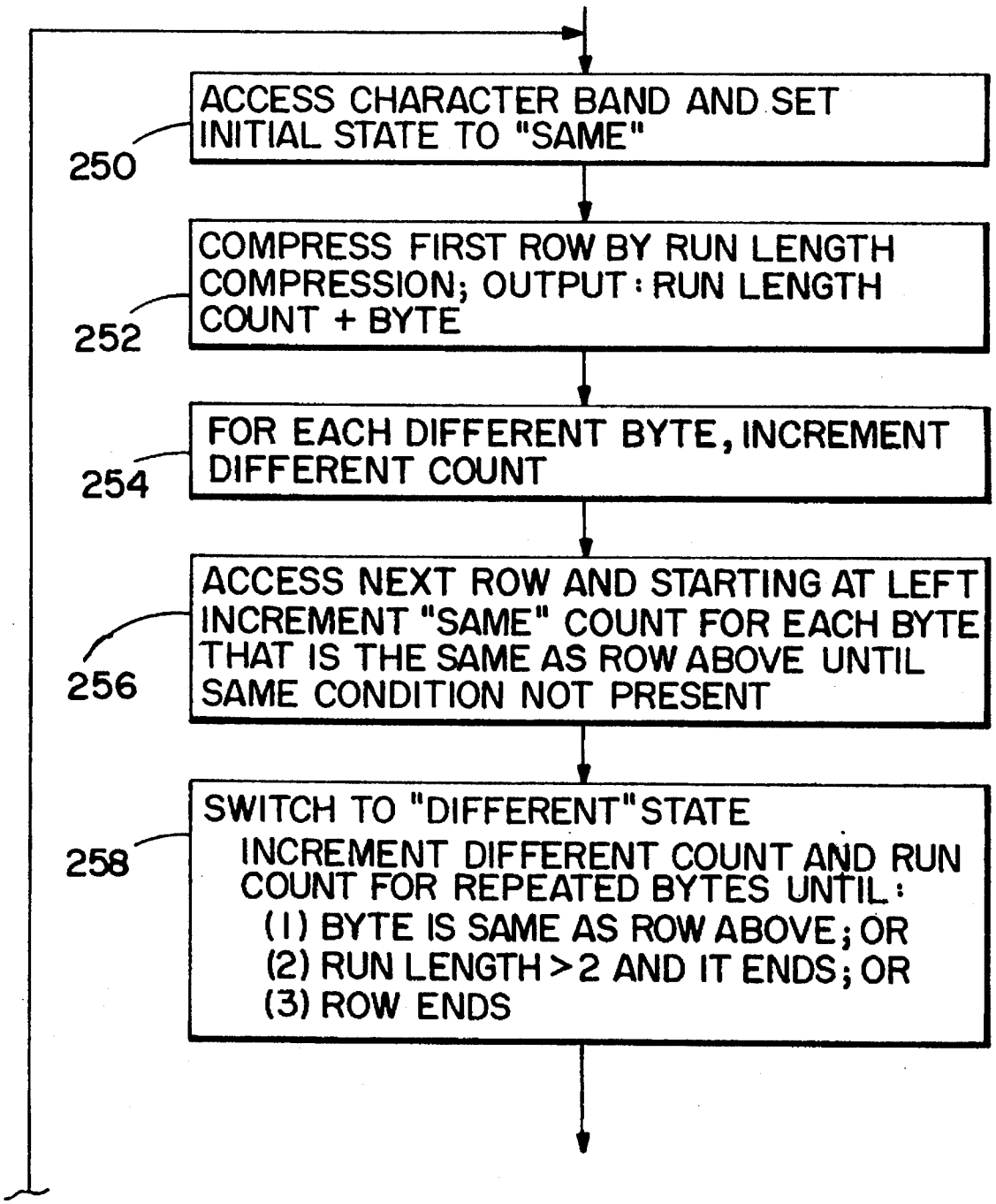
FIGS. 11 and 12 are high level flow diagrams illustrating a high speed data compression technique (termed mode M) that is employed herewith.
Figure 12:
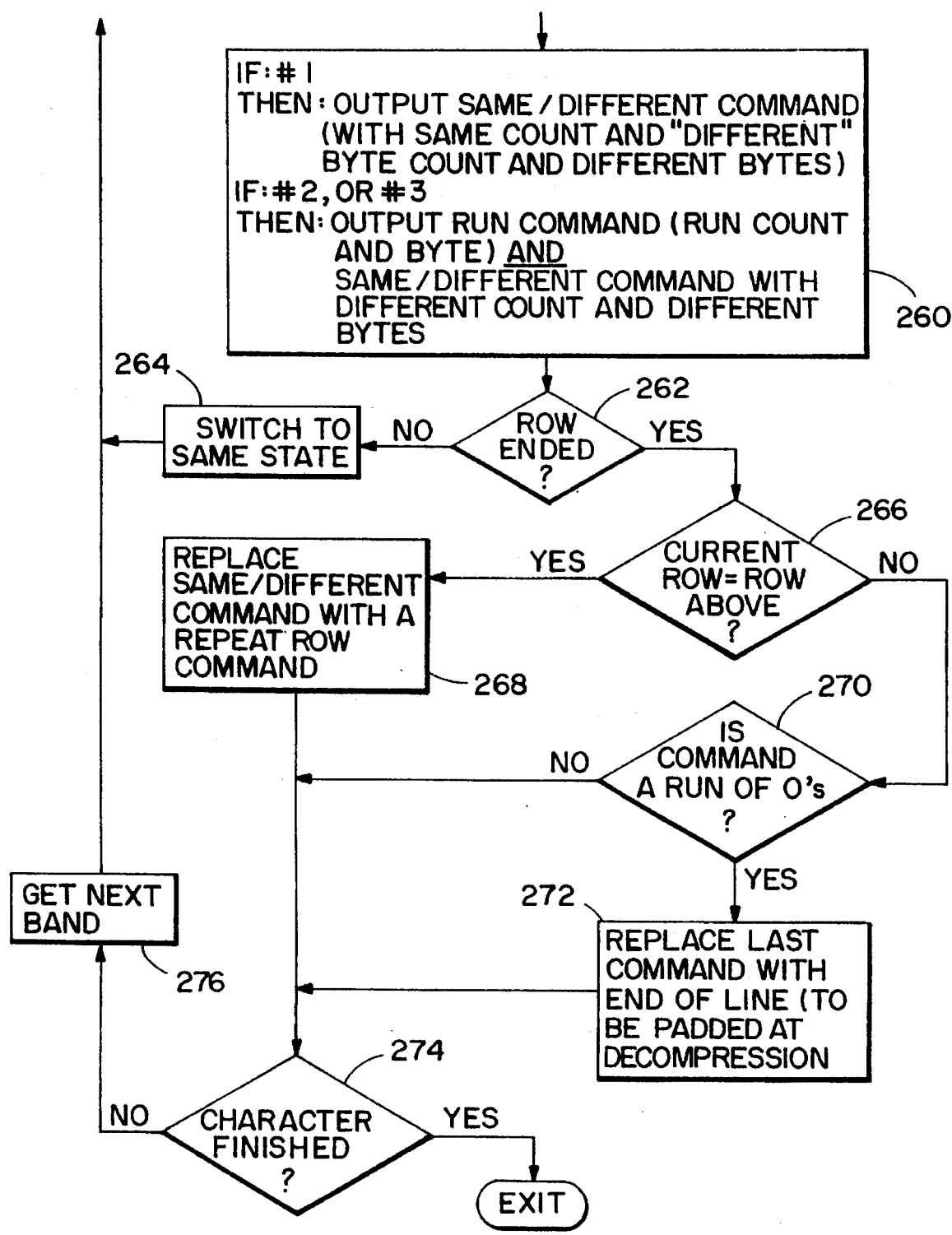

As shown in FIG. 11, it is assumed that the initial state of the mode m compression procedure is set to "same" (box 250). The first row of a band is then considered and run length compression is performed with respect to bytes therein (box 252). To the extent there are any run lengths of bytes, a run length command is issued for each "run" byte and the count of the "run". In addition, the remaining bytes in the row are output as "different" data in a "same/different" command, wherein the "same" value is set equal to 0. This command will be described in further detail below.

As shown in box 254, since each byte in the first row of a band is "different" by definition (there is no row above the initial row), the "different" count is incremented and is reset at the end of the row, and at the end of each run within the first row. Then, a next row is accessed and, starting at the left, each byte is examined to determine if it is the same as the byte that is vertically aligned in the immediately preceding row. For as long as a "same" condition is satisfied, a "same" count is incremented until a byte is encountered that is different from a vertically aligned byte in the preceding row (box 256).

The procedure switches to a "different" state and increments a "different" count so long as the "different" condition is satisfied. A run count is maintained for "different" words. (This action optimizes the compression procedure for high decompression speed as it does not count for "runs" during the "same" state. A higher compression ratio may be achieved by considering run count during the "same" state).

At each state switch, a same/different command is issued that includes a "same" count, a "different" count, and the identity of the "different" bytes that follow the "same" byte. The different state continues until (1) a byte is encountered in the row that is the same as a vertically aligned byte in the row above; or (2) a run length is encountered that is greater than two; or (3) the row ends (box 258). Keeping in mind the procedure is still in the "different" state, when a byte is encountered that is the same as the row above, a state switch back to "same" is made and a same/different command is output, as described above.

If a run length greater than two is encountered and it ends, a run command is output including a run count and the byte that is run. A same/different command is also output with a different count and the different bytes that were experienced (box 260). This different count does not include a count of run data.

It is now determined whether the row has ended (box 262) and if not, a switch is made back to the same state (box 264), and the procedure recycles back to box 256. By contrast, if a row has ended, it is determined whether the entire current row is the same as a row above (decision box 266). If yes, the same/different command issued for the row is replaced with a "repeat row" command that is more compact than the same/different command. If however, the current row is not the same as the row above, then it is determined whether the last issued command indicated a run of zeros (decision box 270). If yes, the last command is replaced with an end of row code, realizing that the row will be padded with zeros at decompression time (box 272).

At this stage it is determined whether the character processing has finished (decision box 274) and if no, a new band is accessed (box 276) and the procedure recycles.

BIT RUN LENGTH (BRL) COMPRESSION

As above indicated, BRL is used for character bit maps that are relatively small (i.e., 24 points or smaller) as it works well on small characters because bit runs that are present therein typically are longer than four bits, and BRL codes each bit run into a four bit field. BRL also works for larger characters but is not optimal since larger characters have a greater degree of row and byte similarity and can be better compressed by mode m. As shown in FIG. 13, the basic BRL compressed byte is two, four-bit run length values. The most significant four bits are the number of zero bits to run and the least significant four bits are the number of one bits to run. If the run required is fifteen bits or longer, it is continued in another byte, by placing a zero in the next four bit run length field for the other bit value. Thus, (as shown in box 300) the procedure starts by counting the number of identical bits until a complementary bit is found. At that point, an eight bit byte is employed (box 302) and, in dependence upon the type of bits being counted, a count is entered in the first four bit field or the second four bit field. If the count exceeds fifteen, the complementary bit field is set to zero and the count continues in a next byte (box 304). The procedure continues until the bit run terminals, at which point, complementary bits are counted until a true bit occurs, and the procedure repeats.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. In a peripheral unit that converts an input data stream to a page arranged output and has random access memory that is insufficient to store certain page configurations, said peripheral unit including a processor and a control memory including at least one data compression procedure, said peripheral unit adapted to compress character fonts, said peripheral unit performing a method comprising the steps of:

a) issuing a memory low/out signal when insufficient random access memory is available to store portions of said input data stream;

b) if graphics images are present in portions of said input data stream, attempting to compress said graphics images to remove said memory low/out signal;

c) if said attempted compression recited in step (b) is unsuccessful in removing said memory low/out signal, compressing font characters by use of a said data compression procedure; and d) if no graphics images are present in said portion of said input data stream, compressing font characters, by use of a said data compression procedure.

2. The method as recited in claim 1, wherein steps, (c) and (d) are applied to character fonts stored in said peripheral unit.

3. The method as recited in claim 1 wherein, in step (b), a lossless data compression method is employed in said attempt to compress said raster graphics image.

4. The method as recited in claim 3 comprising the further step of:

e) compressing a font character received in said input data stream, irrespective of a said memory out/low signal, if said font character exceeds a first size threshold.

5. The method as recited in claim 4 wherein each font character is accompanied by data that enables a size of a character to be determined, said data being compared against said first size threshold to determine if said font character exceeds said first size threshold.

6. In a peripheral unit that converts an input data stream to a page arranged output and has random access memory that is insufficient to store certain page configurations, one page configuration comprising a plurality of strips; said peripheral unit including a processor and a control memory including at least one data compression procedure, said peripheral unit performing a method for compressing fonts received via said input data stream, said method comprising the steps of:

a) dividing a font character bit map into a number of sequential bands, each said band having a determined number of raster scan rows;

b) data compressing each said band of said font character bit map so as to substitute for said bit map, a code that indicates bit arrangements within each said band;

c) determining that a band of a font character intersects a boundary between contiguous strips and is present in a strip being processed; and d) decompressing a compressed font character by commencing with the band that intersects said boundary.

7. The method as recited in claim 6, wherein a first data compression method employed in step (b) provides commands which indicate vertical redundancies existing between succeeding rows of a band of raster data and further provides commands indicative of horizontal data redundancies occurring in a said row.

8. The method as recited in claim 7, wherein said data compression method employed in step (b) comprises the further steps of:

performing run-length encoding for data segments in an initial row of a said band of raster scan rows and outputting, for each run of a data segment in a said raster scan row, a run length command indicating a run count and an identification of the run data segment;

for data segments in a subsequent row of said band, comparing whether said data segments are the same as or different from data segments in an immediately previous raster scan row in said band; and issuing commands which identify for said subsequent raster scan row, which of said data segments exhibits a "same" condition and further indicates "different" data segments.

9. The method as recited in claim 7 comprising the further step of:

determining if said first data compression method compressed said font character and if not and if said font character size is less than a predetermined threshold, employing a second data compression method on said font character that identifies runs of like bits in each band raster bit map of said font character.

10. The method as recited in claim 9 wherein a count of like bits is represented by an n-bit data segment, with a first field of n/2 bits representative of a one bit run count and a second field of n/2 bits representative of a 0 bit run count.

11. The method as recited in claim 10 wherein a count of bits of one kind that exceeds the ability of n/2 bits to represent, is evidenced by succeeding n-bit data segments, each with the field representative of a number of second kind bits set equal to zero.

12. The method as recited in claim 6 wherein step (d) comprises the further steps of:

converting said band into a plurality of raster scan rows; and selecting for said strip being processed a portion of said band that commences with a raster scan row that is the same as a first raster row of said strip being processed.

13. In a peripheral unit that converts an input data flow to a page arranged output, said data flow including data describing an image, said data flow further containing font data, the method comprising the steps of:

automatically applying a lossless compression technique to said font data if a font represented by said font data is at least equal in size to a predetermined first threshold value; and if said size of said font data is less than said predetermined first threshold value, applying a lossless compression procedure to said font data only in the event random access memory is insufficient in capacity to store information derived from said input data flow.

14. The method of claim 13 wherein said lossless compression procedure is applied to font data only in the event said font data exceeds a second threshold value in size, said second threshold value less than said first threshold value.

15. The method of claim 14, comprising the further step of:

automatically revising a said threshold value in accordance with available memory so that compression/decompression time is not expended if sufficient memory is available to store uncompressed font data.

* * * * *